United States Patent [19]
Cox

[11] Patent Number: 6,109,644
[45] Date of Patent: Aug. 29, 2000

[54] UTILITY WAGON

[75] Inventor: Lem L. Cox, New Braunfels, Tex.

[73] Assignee: Alert Services, Inc., San Marcos, Tex.

[21] Appl. No.: 09/321,395

[22] Filed: May 28, 1999

Related U.S. Application Data

[60] Provisional application No. 60/087,172, May 29, 1998.

[51] Int. Cl.[7] .......................................................... B62B 1/04

[52] U.S. Cl. ...................... 280/652; 280/655; 280/47.24; 280/47.29

[58] Field of Search .................................... 280/639, 651, 280/652, 655, 47.17, 47.18, 47.24, 47.27, 47.29, 47.33

[56] References Cited

U.S. PATENT DOCUMENTS

| | | | |
|---|---|---|---|
| 4,561,674 | 12/1985 | Alessio | 280/47.29 |
| 5,080,387 | 1/1992 | Ryals | 280/652 |
| 5,154,441 | 10/1992 | White et al. | 280/652 |
| 5,178,404 | 1/1993 | Chen | 280/652 |

FOREIGN PATENT DOCUMENTS 379299   8/1964   Switzerland ......................... 280/47.29

*Primary Examiner*—Richard M. Camby
*Attorney, Agent, or Firm*—Jackson Walker L.L.P.

[57] ABSTRACT

A utility wagon has a main beam and a removable handle, a removable tail member, first and second wheels, and two cross members. The cross members are provided with uprights which may be adjusted to accommodate various sizes of baskets and carriers.

7 Claims, 3 Drawing Sheets

UTILITY WAGON

This application claims priority to U.S. Provisional Patent Application Ser. No. 60/087,172, filed May 29, 1998.

BACKGROUND OF THE INVENTION

The present invention relates to a transport hand-cart. More specifically the hand-cart is a utility wagon extensible in both its length and width.

Most existing wagons are of a fixed size and can accommodate only fixed sized loads. This is particularly true regarding the width of the wagon because a common axle generally carries both wheels. The present invention allows the operator to vary the length of the load carrying area to expand from 27" to 45" long. Further, the width may vary from 18" to 24" because each wheel has a separate axle.

SUMMARY OF THE INVENTION

The present invention is a unique utility wagon having a single central, main beam extensible in both its length and width. A removable handle is slidably attached within a mouth of the main beam. A removable tail section is slidably attached within a tail opening of the main beam. The length of the wagon may be varied by extending or compressing the extension of the handle and the tail.

Front and rear cross members are attached transversely across the main beam. Each cross member has two side openings to receive removable, slidable side uprights within the openings. The side uprights may be extended or compressed to vary the width of the wagon.

Large inflatable tires rotatably attach to the rear side upright members by separate axles. This allows the width distance between the wheel to be varied.

A number of accessories including a basket or a flat platform may be supported by the wagon either for storage or transport. The cart is an extremely versatile utility wagon.

BRIEF DESCRIPTION OF THE DRAWINGS

FIG. 1 A illustrates the alternative sliding and latching mechanism of the present invention.

DETAILED DESCRIPTION OF THE PREFERRED EMBODIMENT

Figure 1:
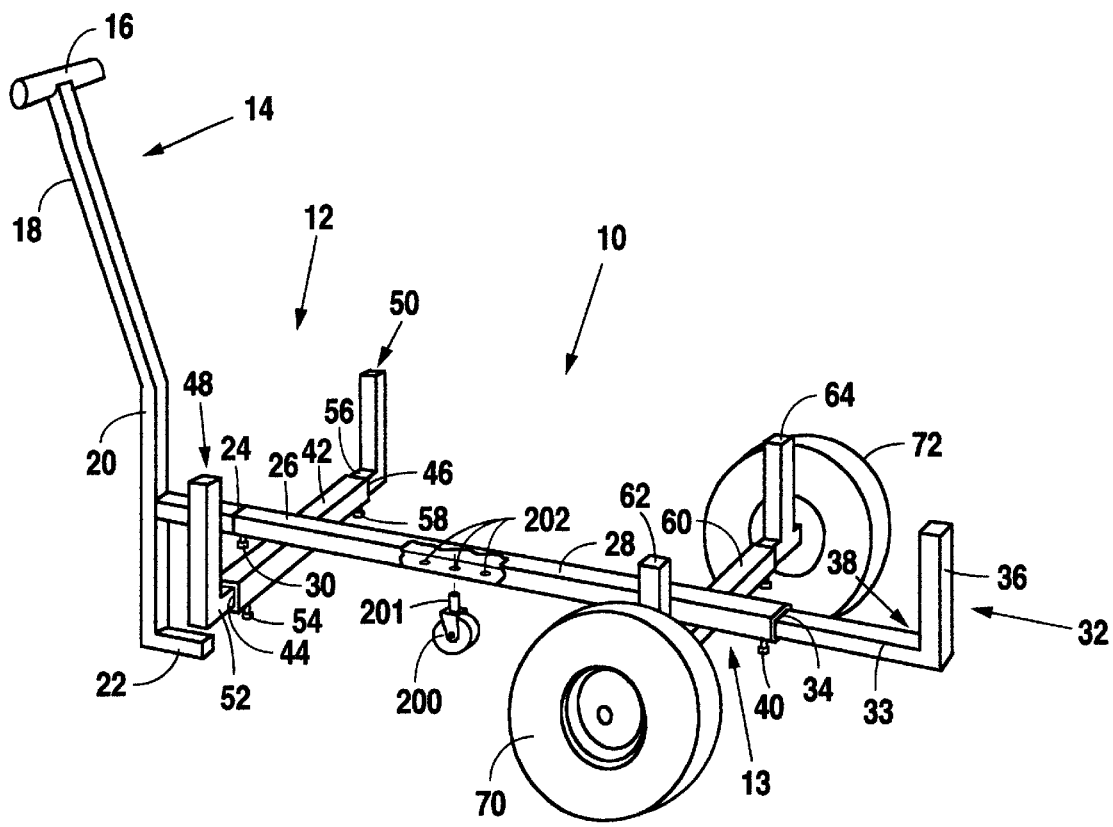
FIG. 1 illustrates a perspective view of the present inventive wagon without any accessories.
Figure 1A:
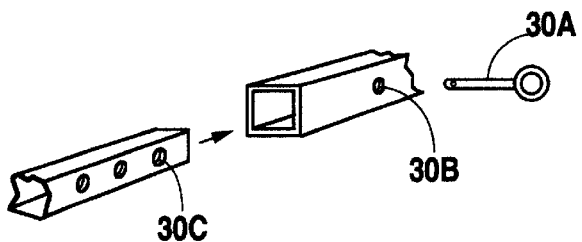
Figure 2:
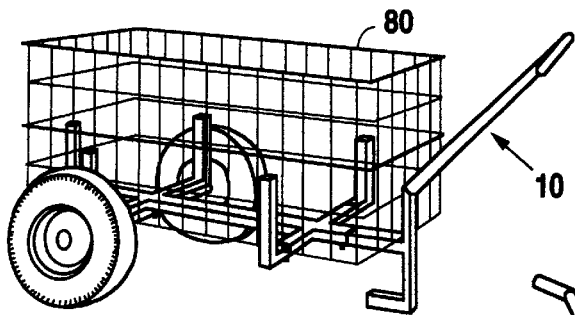
FIG. 2 shows the inventive wagon with a basket.
Figure 3:
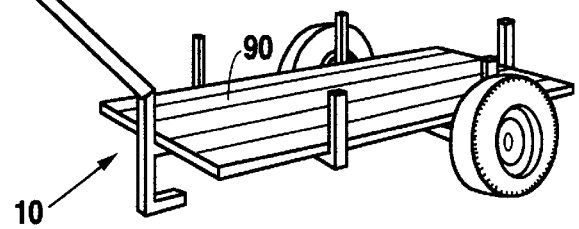
FIG. 3 shows the inventive wagon with a plywood base.
Figure 4:
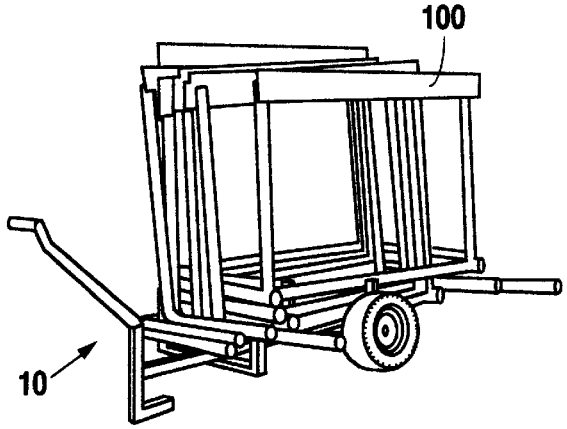
FIG. 4 shows the inventive wagon with an arrangement of hurdles.
Figure 5:
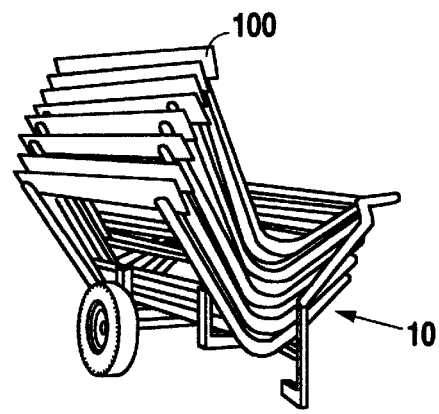
FIG. 5 shows the inventive wagon with another arrangement of hurdles.
Figure 6:
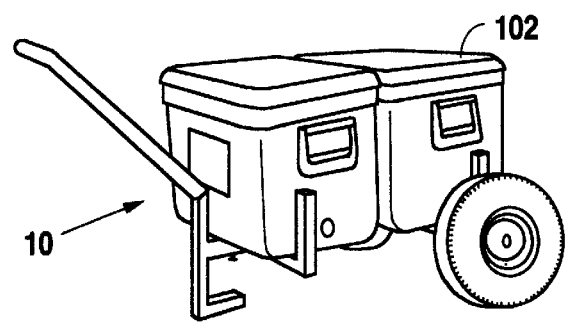
FIG. 6 shows the inventive wagon with two ice chests.
Figure 7:
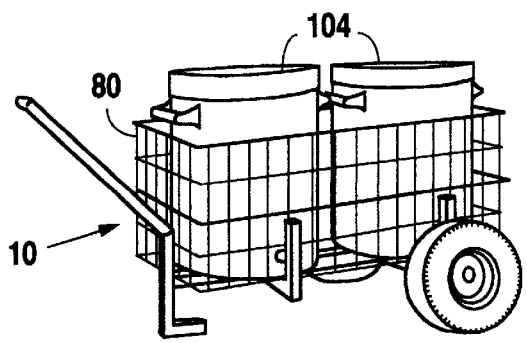
FIG. 7 shows the inventive wagon with a basket containing two coolers.
Figure 8:
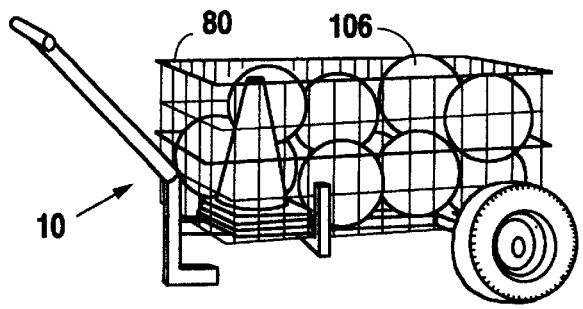
FIG. 8 shows the inventive wagon with a basket containing cones and balls.
Figure 9:
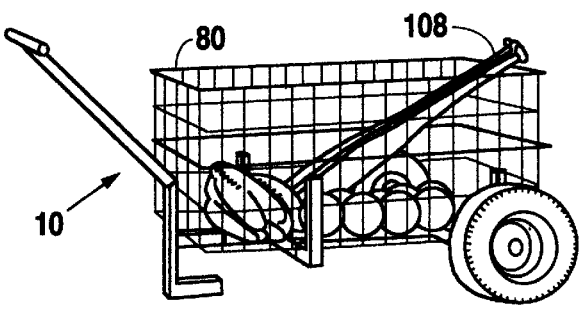
FIG. 9 shows the inventive wagon with a basket containing bats, gloves and balls.
Figure 10:
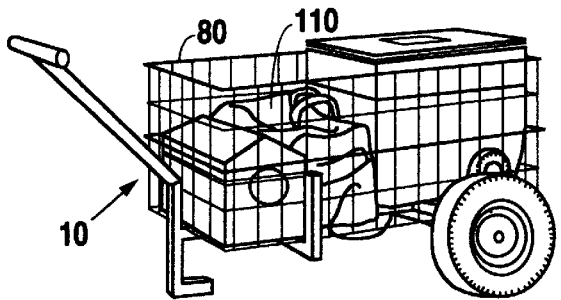
FIG. 10 shows the inventive wagon with a basket containing first aid equipment.
Figure 11:
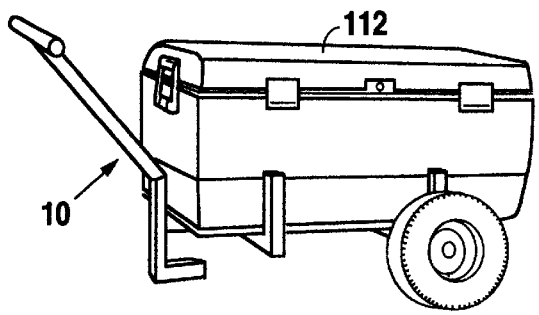
FIG. 11 shows the inventive wagon with an extended box cooler.
Figure 12:
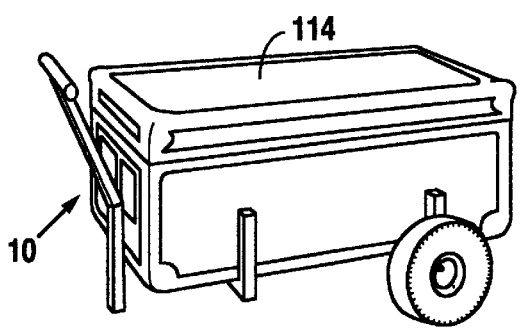
FIG. 12 shows the inventive wagon with a long, low, travel trunk.

FIG. 1 illustrates the present inventive wagon 10. At the front end 12 is a removable handle 14 having a grip 16 at a first end, a long, angular neck portion 18 and a generally vertical downwardly depending leg 20 with a foot 22 extending generally perpendicular to the leg 20 at the bottom of the leg 20. The foot 22 ensures that the wagon 10 remains generally level during loading and unloading. The handle 14 may be made of box tubing or other tubular materials. A connecting tongue 24 extends outwardly generally perpendicular to the leg 20 and is spaced above the foot 22. The tongue 24 slidably extends into the mouth 26 of the main wagon support beam 28. Tongue 24 and handle 14 may be tightened or loosened within beam 28 by tightening or loosening a mouth locking bolt 30 which extends through a hole in the under side of beam 28 near the mouth 26. As bolt 30 is tightened it urges against a portion of tongue 24 inside of the beam 28. Alternatively, a detent locking pin 30A may be used to pass through holes 30B and 30C as shown in FIG. 1A In a like manner an extensible tail member 32 has a tail beam 33 sized to slidably fit within the tail opening 34 at an opposite end of main support beam 28. Tail member 32 has an upwardly extending rear arm 36 affixed to the distal end 38 of tail beam 33. As with the handle 14, the tail member 32 is held in place by tail locking bolt 40 (or a detent locking pin) extending through the underside of beam 28 and urging against a portion of the tail beam 33 inside of the main beam 28. A detent pin would pass through both the main beam 28 and the tail beam 33.

When the handle 14 is fitted closely to the main beam 28 with tongue 24 fully inserted into the beam 28 and when the tail member is fitted closely to the main beam with tail beam 33 fully inserted into the tail opening 34, the wagon length is approximately 27" long. When the handle 14 and tail member 32 are filly extended, the wagon length is approximately 45" long. It should be understood that the user may vary the amount of extension to vary the length of the cart.

At the mouth end of the main beam 28, a front cross member 42 is affixed to the main beam 28. Cross member 42 is made of box tubing or other suitable construction and has a left-side, end opening 44 and a right-side, end opening 46 sized to receive "L" shaped side uprights 48 and 50. The base section 52 of the "L" shaped side upright 48 extends into opening 44 and may be held in place by side locking bolt 54 (or a detent locking pin) as previously discussed with mouth locking bolt 30 (and detent pin 30A).

The base section 56 of "L" shaped side upright 50 extends through opening 46 and may be 4 held in place by side locking bolt 58. When the side uprights 48 and 50 are closely fitted to the cross-member 42, the width measurement between the upright is approximately 18" wide. When fully extended it is approximately 24" wide.

At the rear 13 of the main beam 28 a rear cross-member 60 is attached and provided to accept rear side uprights 62 and 64 which slidingly fit into the ends of rear cross-member 60 as was previously discussed above with cross-member 42 and uprights 48 and 50. However, on the outside of rear side uprights are rotatably affixed 10" pneumatic wheels 70 and 72. Each wheel has its own axle which attaches to the separate and independent rear side uprights 62 and 64. When the rear side uprights are close the width measurement is 18" wide; expanded the width is approximately 24" wide. Again, it should be understood that the user may vary the width both at the front and rear of the cart, as desired.

FIGS. 2–13 show the numerous configurations which may be made with the present invention. Two primary accessories used with the wagon 10 are the chrome basket 80 (36" long×20" wide×15" deep–2⅞"×5" mesh) and plywood base 90 (42" long×22" wide×⅜" thick) shown in FIGS. 2 and 3 respectively. These accessories fit between the front leg 20, the two front uprights 48 and 50, the two rear uprights 62 and 64, and the tail uprights. Because of the wagon's capability to vary its length and width, the user may place a variety of items on the wagon.

The wagon has over fifty sport and sport related uses. It has been used to transport an injured player from the playing field to the sideline on the plywood platform 90. The wagon may also be used to haul garden equipment and supplies. Only the user's imagination limits the usefulness of the present invention.

Figure 13:
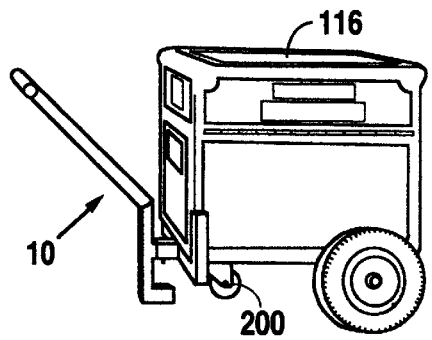
FIG. 13 shows the inventive wagon with an auxiliary wheel with another travel trunk.

FIG. 13 shows the wagon with auxiliary wheel 200 attached to the underside of beam 28 in hole 202. A multiplicity of holes 202 may be disposed along the underside of beam 28. The wheel neck 201 may be releasably inserted into the hole 202 to add greater stability to the wagon.

The large 10" inflatable tires provide for easy transport of loads of approximately 200 lbs. over most terrain. The removable tongue 24 allows for easy storage of the wagon between bus seats or the trunk of a car.

Although the invention has been described with reference to a specific embodiment, this description is not meant to be construed in a limiting sense. On the contrary, various modifications of the disclosed embodiments will become apparent to those skilled in the art upon reference to the description of the invention. It is therefore contemplated that the appended claims will cover such modifications, alternatives, and equivalents that fall within the true spirit and scope of the invention.

What is claimed is:

1. A utility wagon comprising:

a main beam;

a removable handle slidably attached within a mouth of said beam;

a removable tail member slidably attached within a tail opening of said beam;

a front cross member attached to and extending transversely across a front section of said beam, said front cross member having a first side opening and a second side opening;

first and second front side upright members removably attached to and slidable within said first side opening and said second side opening of said front cross member, respectively;

a rear cross member attached to and extending transversely across a rear section of said beam, said rear cross member having a third side opening and a fourth side opening;

first and second rear side upright members removably attached to and slidable within said third side opening and said fourth side opening of said rear cross member, respectively;

first and second wheels rotatably attached to first and second axles, said first axle attached to said first rear side upright member and said second axle attached to said second rear side upright member.

2. The wagon of claim 1 further comprising a leveling and support foot attached to said handle and extending beneath said main beam.

3. The wagon of claim 1 further comprising a basket supported on said beam.

4. The wagon of claim 1 further comprising a generally flat platform supported by said beam and said front and rear cross members.

5. The wagon of claim 1 further comprising a foot extending generally perpendicularly from said handle.

6. The wagon of claim 4 further comprising a grip attached to a top of said handle.

7. The wagon of claim 1 wherein said wheels further comprise inflatable tires.

\* \* \* \* \*